United States Patent [19]

Jerrett

[11] Patent Number: 4,844,012
[45] Date of Patent: Jul. 4, 1989

[54] FISH TRANSPORT SYSTEM

[75] Inventor: Alistair R. Jerrett, Wellington, New Zealand

[73] Assignee: New Zealand Government Property Corporate, Wellington, New Zealand

[21] Appl. No.: 284,791

[22] Filed: Dec. 12, 1988

Related U.S. Application Data

[63] Continuation of Ser. No. 222,363, Jul. 20, 1988, abandoned, which is a continuation of Ser. No. 865,856, May 22, 1986, abandoned.

[30] Foreign Application Priority Data

May 23, 1985 [NZ] New Zealand ................... 212177

[51] Int. Cl.$^4$ .............................................. A01K 61/00
[52] U.S. Cl. .............................................. 119/3; 119/2
[58] Field of Search ........................................ 119/2-5

[56] References Cited

U.S. PATENT DOCUMENTS

| | | | |
|---|---|---|---|
| 160,002 | 2/1875 | Bond | 119/3 |
| 485,422 | 11/1892 | McGray | 119/2 |
| 884,140 | 4/1908 | Erlwein et al. | 119/3 X |
| 1,639,555 | 8/1927 | Clark | 119/2 |
| 2,680,424 | 6/1954 | Brown | 119/3 |
| 3,687,111 | 8/1972 | Epper | 119/2 |
| 4,162,681 | 7/1979 | Patterson | 119/3 |
| 4,357,902 | 11/1982 | Sheldon et al. | 119/2 |

Primary Examiner—David A. Scherbel
Assistant Examiner—Richard E. Chilcot, Jr.
Attorney, Agent, or Firm—Fleit, Jacobson, Cohn, Price, Holman & Stern

[57] ABSTRACT

A method of transporting live fish is disclosed. The method comprises inducing in the fish a state of piscine immobility syndrome. Piscine immobility syndrome means the hypnotic-like, apparently behavioral, state in fish appear to assume a relaxed state. The state of piscine immobility syndrome is maintained in the fish while transporting the fish to the desired destination. It has been found that a state of piscine immobility syndrome can be induced by physically restraining the fish against substantial movement and supplying water of a particular quality to the fish.

14 Claims, 3 Drawing Sheets

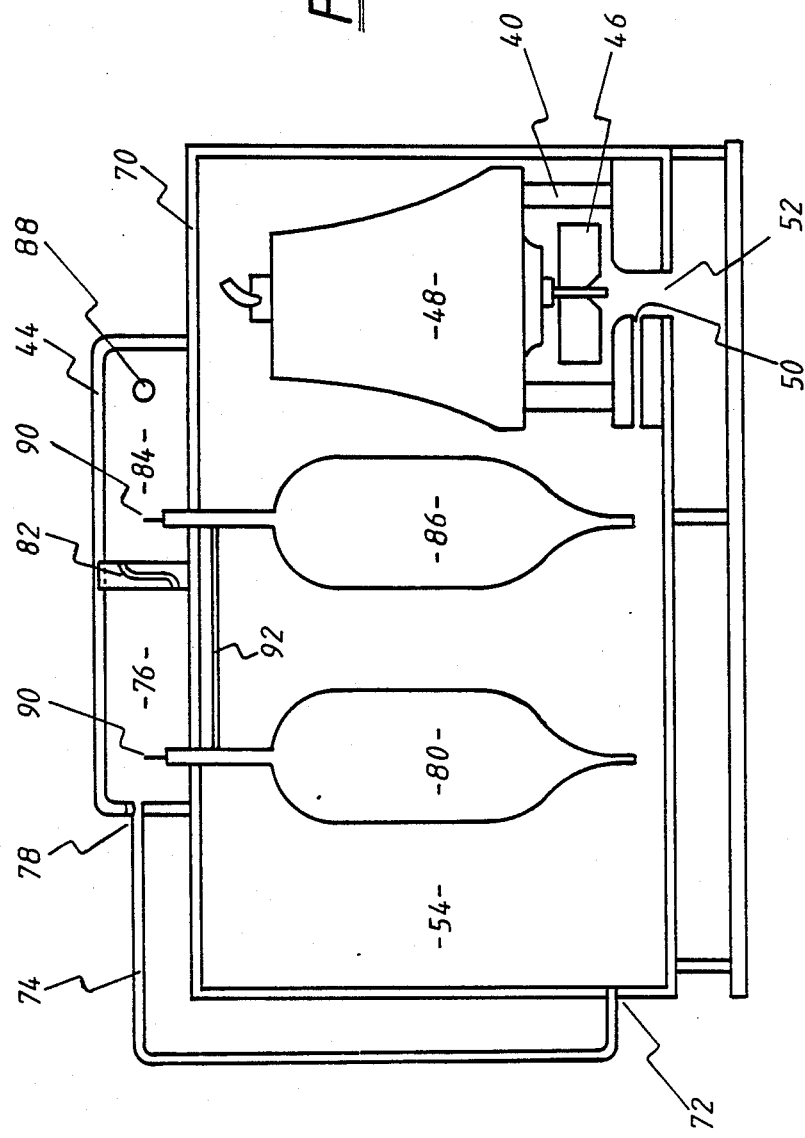

FISH TRANSPORT SYSTEM

This is a continuation of application Ser. No. 222,363, filed July 20, 1988, now abandoned, which is a continuation of application Ser. No. 865,856, filed May 22, 1986, now abandoned.

This invention relates to a Fish Transport system and in particular to a method of and/or apparatus for transporting fish in the live state.

It is an object of the invention to provide a method of and/or apparatus for transporting fish in the live state which will at least provide the public with the useful choice.

Accordingly, in one aspect, the invention consists in a method of transporting live fish said method comprising the steps of inducing a state of piscine immobility syndrome, as herein defined, in said fish and maintaining said state while displacing the fish to the desired destination.

In a further aspect the invention consists in apparatus for transporting fish in the live state said apparatus comprising a container; means to restrain said fish against substantial movement within said container; and means to supply water to said fish, while restrained, of a quality sufficient to maintain said fish in a state of piscine immobility syndrome as herein defined.

In yet a further aspect the invention consists in water treatment apparatus for treating water used by fish or other freshwater and marine animals, said apparatus including filtering means to filter particulate matter from the water; oxygenating means to oxygenate said water; and ammonia removal means to remove ammonia from said water.

To those skilled in the art to which the invention relates, may changes in construction and widely differing embodiments and applications of the invention will suggest themselves without departing from the scope of the invention as defined in the appended claims. The disclosures and the descriptions herein are purely illustrative and are not intended to be in any sense limiting.

One preferred form of the invention, in its various aspects, will now be described with reference to the accompanying drawings in which:

FIG. 6 shows a front sectional elevational view of the water treatment unit shown in FIG. 4.

Figure 1:
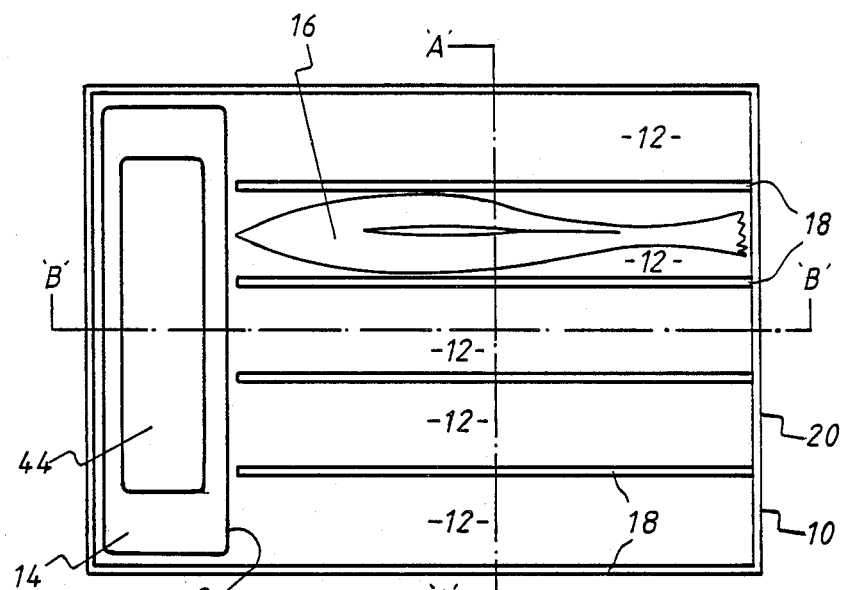
FIG. 1 shows a schematic plan view of fish transport apparatus according to the invention.

In one aspect, and broadly stated, the invention provides a method of transporting fish which comprises inducing a state of piscine immobility syndrome in the fish and then displacing the fish, in a suitable container, to the desired destination while maintaining the fish in the immobile or quiescent state. At the destination the fish will generally be allowed to recover out of the quiescent state.

As used herein the term 'piscine immobility syndrome' means the hypnotic-like, apparently behavioural, state which fish are observed to assume in certain circumstances. The state is broadly equivalent to the well documented 'tonic immobility' observed in higher species i.e the state which occurs when prey "freeze" in the presence of predators, the principal difference being that where, in those circumstances, the prey display tonic muscle contraction, fish appear to assume a "relaxed" state in which they are unresponsive to much external stimulii and changes in environment.

We have found that such a state can readily be induced in common species of fish by physically restraining the fish against substantial movement and supplying water of a particular quality to the fish, there being no need to add foreign substances to the water or impart any artificial stimuli to the fish. It is believed, however, that other methods including chemical methods, could be used to induce the syndrome in fish.

The precise method of inducing piscine immobility appears to vary depending on the species of the fish though the provision of good quality water appears essential for the maintenance of the state. For most common forms of edible fish restraint is necessary. For more active fish not only is restraint necessary but the water must be supplied in a manner which irrigates the gills. This is most advantageously achieved by supplying the water through a nozzle which is engaged in the mouth of the fish.

Other fish show a reluctance to take a nozzle in the mouth and water is therefore provided, at higher flow rates, external to the fish.

Where restraint is provided it is preferably configured so that at least the respiratory surfaces of the fish are immersed in water and the fish is oriented in the normal swimming configuration, the fish being restrained not only against lateral movement but also against fore and aft movement. Further, the restraint should support the lower ventral surfaces of the fish and may be resilient to minimise any shock transferred to the fish during movement. Suitable resilient packing not only better supports the fish but can also protect the flesh of the fish from chaffing during transport.

The water supplied to the fish is retained by the container and/or restraint about the fish and is preferably maintained as close as possible to the acclimated temperature of the species being transported. If the water temperature rises too high the fish become active, are subjected to stress, and could emerge from the immobile state. Some advantages may be gained from lowering the water temperature below the acclimated temperature, however if the temperature is to be lowered care must be taken to ensure that the rate of cooling does not lead to cold shock or cold anaestnesia, both of which can be fatal.

In the transport application it is important that the amount of water included in the transport container be kept to a minimum. In view of this, and having regard to the needs of the fish if they are to be maintained in the immobile state, it is important that the quality of the water supplied to the fish be maintained at the highest possible level. Further, having regard to the "closed" nature of transport containers it is preferred that the water supplied to the fish be obtained from that to which the fish have already been exposed. Thus, it is preferred that the water be recycled and treated during the recycling process.

Ideally the water conditions should be the same as those of clean water taken from the natural habitat of the fish. In practise, however, it is difficult to reproduce water quality in water recycled from a confined area containing live fish.

High concentrations of free ammonia and free carbon dioxide typically build up in the confined volume containing the live fish. These have to be removed as far as possible as does any particulate matter and suspended or dissolved organic matter present in the water which tends to irritate the gill surfaces if passed back to the fish. Further we have found that if the water passed back to the fish contains fine bubbles the fish become highly excited and thus stressed particularly where the water flow directly irrigates the gills of the fish. When stressed the fish can consume more oxygen and excrete more carbon dioxide and other matter thus placing a greater loading on the system.

Clearly the water returned to the fish has to be oxygenated, the general aim being to maintain the oxygen content of the water as close as possible to 100% saturation, at sea level, at all times. According to the method of the invention oxygenation is preferably achieved by vigorous stimulation of the water, in a chamber remote from the fish, in the presence of an oxygen or air supply. This method of oxygenation has attendant advantages in that the physical stimulation serves to drive off a good proportion of the free carbon dioxide and also, by a process of foam fractionation, much of the particulate material present in the contaminated water including dissolved and suspensing Organic matter. This particulate matter, and indeed other matter driven off by the foam fractionation process, can be subsequently removed from the water surface.

The level of free or un-ionized ammonia retained in the water depends largely on the pH level of the water. Sea water typically has a pH in the range 8.0 to 8.3. Thus, to remove much of the ammonia present in the water contaminated by the live fish the pH can, if desired, be lowered, typically to the range 7.2 to 7.5. For fresh water fish the pH levels will invariably differ.

In the method according to the invention the pH is, of course, determined to some extent by the aeration process hereinbefore described as, in driving off free carbon dioxide, the process causes the pH to rise. In addition, however, the water is preferably passed through a chemical dosing or treatment loop to reduce the free ammonia content of the water. In the treatment loop the ammonia is preferably removed by chlorinating the water. Chlorination by the addition of hypochlorite solution, preferably sodium hypochlorite, in seawater results in the production of hypobromite according to the following reaction:

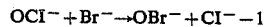

$$OCl^- + Br^- \rightarrow OBr^- + Cl^- - 1$$

In seawater the hypobromite, in excess, reacts rapidly with ammonia to form nitrogen and bromide ions according to the following reaction:

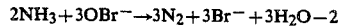

$$2NH_3 + 3OBr^- \rightarrow 3N_2 + 3Br^- + 3H_2O - 2$$

Urea excreted by the fish is though to react in a similar manner, namely:

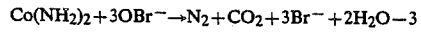

$$Co(NH_2)_2 + 3OBr^- \rightarrow N_2 + CO_2 + 3Br^- + 2H_2O - 3$$

In fresh water a similar reaction scheme will result from chlorination except that in low bromide waters the hypochlorite will react with the ammonia in the absence of hypobromite. This reaction is slow and may be enhanced by the addition of bromide to the hypochlorite solution. The excess hypochlorites and hypobromites and the remaining chloramines and bromamines are removed by dosing with hydrogen peroxide which can also act as an oxadent for other dissolved organic matter present in the circulating water.

Clearly other methods of removing excess chlorine from the water could be used including passing the water through a bed of activated carbon.

One alternative to the dosing system described above would be a biological filter to remove ammonia. Further, in fresh water applications, an ion exchange resin could be used.

Obviously the amounts of chlorine and peroxide dosing must be carefully controlled. In particular it is important that the amount of free chlorine be kept to an absolute minimum as an excess could be fatal for the fish. Nevertheless both chlorine and peroxide serve to 'steralise' the water and not only serve to control the ammonia content in the water but as stated above, may also serve to remove or neutralise organic matter in the water.

Matter such as faeces, vomit, slime, and particles of scale not removed by the foam fractionation process described above are preferably removed by a simple foam plastics barrier filter although, over periods of prolonged use, such a filter does tend to become blocked by slime. The foam also serves as a primary ennucleation surface for very fine bubbles present in the water, the bubbles agglomerating to some extent upon displacement through the filter. This ennucleation is enhanced if the foam is soaked in a food grade antifoaming agent such as that sold under the trade mark DOW CORNING (type A or 1500).

The foam plastics filter element is preferably supported, against water flow, by secondary ennucleation means in the form of plastic packing material through which the filtered water may flow along a convoluted path, the larger bubbles remaining in the filtered water agglomerating so that, at the output side of the packing material, all bubbles are removed from the water.

Prior to insertion into the transport container the fish are preferably fasted. The degree of fasting will depend on the species of fish but typically the fish are fasted for two to four days. This ensures that once the fish are placed in the container the levels of particulate matter and ammonia excreted by the fish are substantially reduced thus reducing the loading on the water treatment system.

The total amount of water needed to be supplied to the fish varies depending on the species of the fish and the configuration of the transport container. It is believed, however, that the respiratory surfaces of the fish must be kept constantly wetted.

Figure 2:
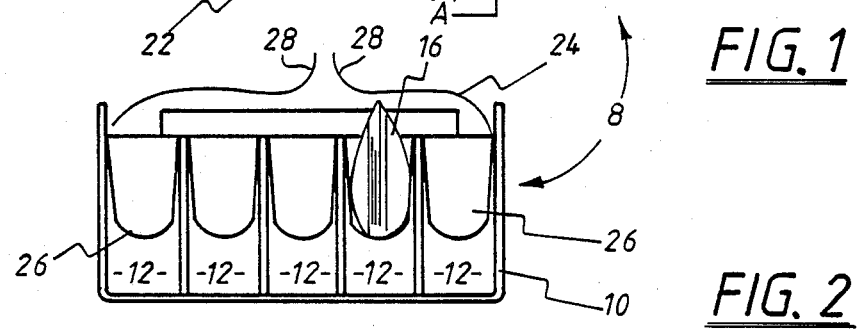
FIG. 2 shows a view along the line A—A in FIG. 1.
Figure 3:
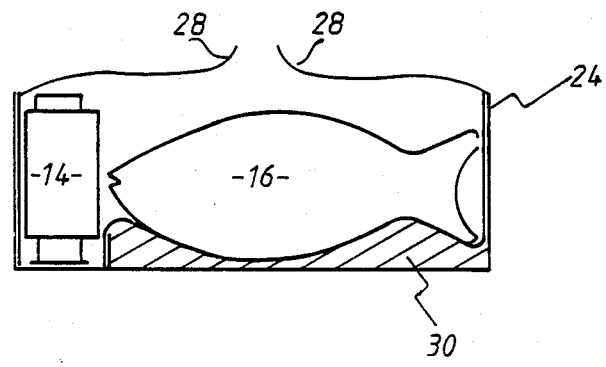
FIG. 3 shows a view along line B—B in FIG. 1.

Turning now to the drawings and in particular to FIGS. 1 to 3 a simple form of fish transport apparatus 8 is shown comprising a container 10 having a plurality of fish receiving cavities 12 and water treatment means 14 therein. A fish 16 is shown located in one of the cavities 12. Each of the cavities 12 is defined by side walls 18 and part of a common rear wall 20 the side walls 18 terminating adjacent a free space 22 in which the water treatment means 14 is, in use, located. In the form of apparatus shown the distance between side walls 18 may be varied in any suitable way so that the size of the cavities 12 can be varied to accommodate fish of varying size. The container 10 and the walls 18 are preferably formed from a material capable of retaining a liquid without leaching potentially toxic impurities when contacted with the types of water to be retained in the container 10. Suitable materials are sealed from material such as that sold under the trademark STYROFOAM, moulded plastics or plastic lined cardboard.

Each of the cavities 12 is preferably sized and/or shaped so as to allow the fish 16 to be maintained substantially in the normal swimming configuration. The fish may, as shown, be simply placed in the cavities 12 or may, in addition, be packed within resilient material to minimize shock being imparted to the fish during transport handling.

It is preferred that the ventral surfaces of the fish be supported. As shown in FIG. 2 a very simple form of support in the form of a flexible lining 24, is draped over the walls 18, the lower parts 26 being situated well down within the cavities 12 to support at least the lower ventral surfaces of the fish. The material from which the lining 24 is formed is preferably water impervious so that water can be retained therein and, as can be seen, the outer edges 28 of the lining may be moved together and sealed to prevent the spillage of water, it being appreciated, from FIG. 3, that the lining 24 also surrounds the water treatment means 14.

As can be seen from FIG. 3, support of the ventral surfaces of the fish may be enhanced by the provision of a separate shaped support member 30. The member 30 may be formed from the same material as the walls 18. The support member 30 may also be dished along the longitudinal axis thereof to enhance the support afforded to the fish. The moulded support can be used in combination with lining 24.

The precise configuration of the transport container is not essential. All that is required is that the container including its various compartments be formed in a suitable manner to afford reasonable lateral, fore and aft, and vertical restraint for the fish while retaining water in contact with the fish. Clearly the size and configuration of the individual cavities 12 may be varied to some extent to allow fish of differing sizes to be transported in the one container 10. Further, the entire container including fish cavities and supports could be moulded in one single piece. The cavities could be the same size or be different.

The transport apparatus 10 further includes means to supply water to the fish retained within cavities 12 of a quality sufficient to maintain the fish in the immobile state. This means preferably comprises means to draw water from the cavities 12, clean and oxygenate the water, and then return it to the fish 16.

Figure 5:
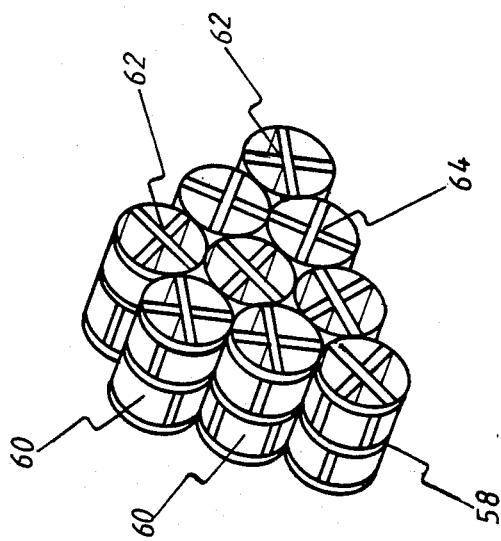
FIG. 5 shows a perspective view of means suitable for providing a secondary ennucleation surface in the water treatment unit shown in FIG. 4.
Figure 4:
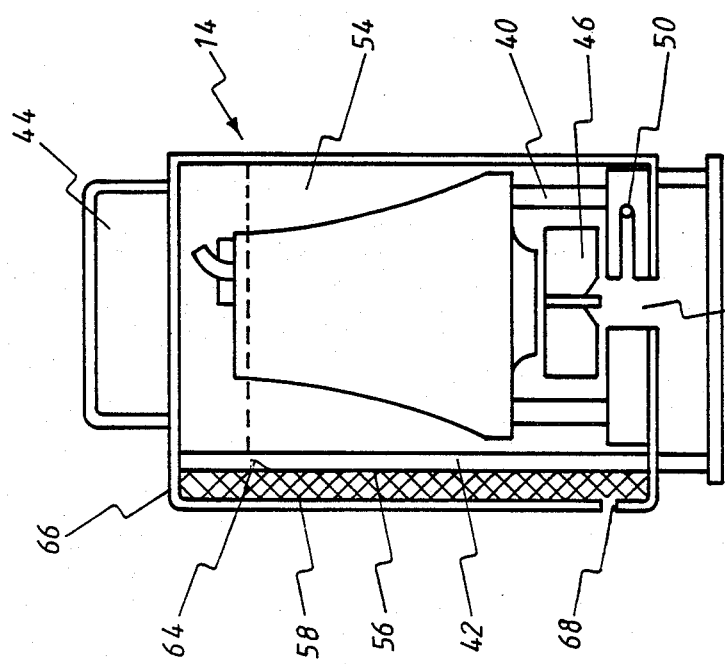
FIG. 4 shows an end elevational view of a water treatment unit suitable for incorporation in the fish transport apparatus according to the invention.

Referring now to FIGS. 4 to 6 the water treatment means 14 broadly comprises oxygenating means 40 to oxygenate the water, filtering means 42 to remove particulate matter from the water, and ammonia removal means 44 to remove ammonia from the water.

In the form shown the oxygenating means 40 also comprises aeration means in the sense that it also serves to drive-off free carbon-dioxide. As shown the means 40 comprises the impeller 46 of submersible pump 48 used to circulate the water in the container 10. The impeller 46 is situated close to an air or oxygen supply 50 and, upon rotation, the oxygen is frothed into the water. We have found that 20 liters of clean sea-water, of 32 parts per thousand salinity, at 15° C. can be taken from 17% saturation to 86% saturation (at sea level) at a rate of about 47.5 mgO$_2$/min using a MARINEPET submersible pump, 1100 gpH continuous rated 24 volts D.C, 2.5 amps. In the form shown a simple tapping 50 is provided adjacent the base of the pump 48 and adjacent the rotating impeller 46 to provide air or oxygen for oxygenation of the water.

It will be noted that the impeller 46 is also adjacent the water inlet 52 from the fish. Thus the particulate matter, dissolved organic matter known in the art as 'carbon', and protenacious waste within this water tends to be removed from circulation by a process of foam fractionation caused by the vigorous foaming action induced by the rotating impeller. This material floats to the surface of the water within the pumping chamber and can be lead off to a waste compartment (not shown).

As described hereinbefore the action of impeller 46, in driving off free carbon dioxide serves to control the pH level of the water, to some extent.

The submersible pump 48 and impeller 46 are retained within a chamber 54. As shown, one vertical wall of the chamber 54 is defined by the filtering means 42 when preferably comprises a foam blanket. The foam blanket filters out remaining particulate matter in the form of faeces, vomit, slime, particles of scale and other debris drawn from the fish retaining cavities 12 and not removed in the foam fractionation process.

The water level within chamber 52 during normal operation is indicated by the dotted line in FIG. 4. A water level of this order when combined with the foaming induced by rotating impeller 46 ensures that the filter becomes blocked from the top down. As the filter progressively blocks, back-pressure on the pump is increased which increases the flow rate over the unblocked filter area. Generally the foam blanket can be removed and cleaned when the apparatus is not in use, or simply replaced.

The foam filter blanket also provides a primary ennucleation surface for very fine air bubbles trapped in the water flow therethrough, the bubbles agglomerating as they pass through the filter. The ennucleation is enhanced if the filter blanket is soaked in an anti foaming agent (food grade) of the type sold under the trademark DOW CORNING.

The rear surface 56 of the foam blanket is preferably supported by means which provide a secondary ennucleation surface for the larger bubbles contained in the water after the water has filtered through the filtering means 42. Any suitable form of packing which provides a convuluted path for the water, has a relatively large surface area, and which would not decay when coming into contact with the water would be suitable however we have found that cylindrical packing material 58 of the configuration shown in FIG. 5 is particularly suitable. As shown this packing material is mounted so that the axes of the cylindrical members are perpendicular to the direction of water flow. The cylindrical members have staggered apertures 60 in the peripheral surfaces thereof and have radially extending internal baffles 62 so that the water flowing down through the packing must follow a convoluted path. The front surface 64 of the members 58, in combination, support the foam filtering blanket 42.

It will be appreciated that as water, with bubbles therein, passes down through the packing material formed by the cylindrical members 58, the bubbles tend to further agglomerate on the surfaces of the cylindrical members 58, combine, and be dispelled off as air. The air, being bouyant, passes upwardly and ultimately out through bleed hole 66 provided in the upper surface of the water treatment means 14. The debubbled water exits from apertures 68 which are adjacent the base of the packing material and, when the water treatment means 14 is positioned correctly within container 10, are adjacent the heads of the fish retained within cavities 12.

The ammonia removal means 44, as shown, comprises a treatment loop provided on the upper part of the housing 70 which, inter alia, defines the pump chamber 52.

In the form shown the treatment loop draws water from chamber 52 through an aperture 72 which is positioned behind filtering means 42. The water passes through conduit 74 and into first chamber 76 through aperture 78. Within the first chamber 76 the water flow is chlorinated preferably by dosing the water with sodium hypochlorite solution from a container 80 retained within the pressurized pump chamber 52. The hypochlorite solution reacts in the manner previously described. The chlorinated water then passes through aperture 82 into chamber 84 where it is subjected to a dosing of hydrogen peroxide sourced from container 86 also located within the pumping chamber 52. The substantially ammonia and chlorine free water is then passed back to the water surrounding the fish through aperture 88.

The containers 80 and 86 are preferably flexible plastics bags which, when subjected to external pressure from the water within chamber 52, meter their contents into the remote chambers 76 and 84 through simple hypodermic syringe needles 90. The rate at which the contents are dispensed into chambers 76 and 84 obviously depends, to some extent, on the pressure within chamber 52 and, to some extent, on the aperture sizes of the needles 90. Depending on the volume of water to be treated, the nature of the required treatment, and the flow rate through the treatment loop the pressure within the chamber 52 and the needle sizes can be varied to achieve the desired treatment.

A pressure equalizing conduit 92 is preferably provided between the containers 80 and 86 to ensure that, should one of the needles 90 become blocked, the contents of the other container are neutralized so that the water is not adversely contaminated by the contents of either container 80 or 86.

A further advantage of the treatment arrangement described is that fluctuations in pump output and head are automatically compensated for ensuring constant dosage concentrations.

The pump 48 is conveniently of a type sold under the Trade Mark MARINEPET and is of the rating hereinbefore specified. In the form shown, the impeller housing has been removed to expose the impeller 46. Clearly this reduces the pumping efficiency but enhances the ability of the pump to oxygenate the water. By maintaining the submersable pump in an overall substantially sealed chamber 52 sufficient pumping head is obtained to provide the flow rates necessary for the operation of the invention.

The power necessary for the operation of pump 48, together with the air to reoxygenate the water, is provided by power and air lines encased with an umbilical cord (not shown). This umbilical cord preferably passes through the opening in the lining 24 to external power and air sources. Further, the umbilical cord may be of a sufficient diameter to allow free gas exchange between the interior and exterior of container 10. In this way, the $N_2$ and $CO_2$ produced by the ammonia removal system 44 and the respiration of the fish respectively are allowed to dissipate. The opening in the waterproof layer through which the cord passes is sealed around the cord to ensure that water does not leak from the container 10 in transit.

It should also be appreciated that a system similar to the ammonia removal system 44 could be incorporated and used for dosing medication, buffers, food etc though in pure transport applications such dosings would be unlikely.

It can therefore be seen that apparatus of the present invention at least in the preferred embodiment described herein possesses a number of advantages over those currently in use. In particular, the container of the present invention causes the fish to assume a quiescent relaxed state by restraining the movements of the fish and providing for the flow of clean reoxygenated water past their respiratory surfaces. This not only allows a far higher density of fish to transport volume to be achieved but also the relaxed state which is assumed has the attendant advantages of "resting" the fish; thus allowing the fish to recover from the stresses typically generated during capture and reducing both the oxygen consumption and the waste production of the fish in transit. Further, the recirculation of the water and consequent removal of the potentially toxic wastes which are produced allows the fish to maintain this relaxed state in a very small volume of water. The recirculation also allows the fish to be in transit for periods longer than were previously known and thus makes the transport of live, healthy fish to distant markets a viable proposition.

What we claim is:

1. A method of maintaining live fish in good condition which comprises enclosing at leat one live fish in a container sized and configured to limit but not prevent movement of said fish within said container, and inducing and maintaining a state of piscine immobility syndrome in said fish, so that said fish may be displaced to a desired destination while remaining alive by supplying a continuous flow of water to said fish over the gills, so that the gills of the fish are always immersed therein, removing water contaminated by said fish continuously from in said container, cleaning and oxygenating the water which has been removed, and returning the cleaned and oxygenated water to the fish.

2. A method as claimed in claim 1 wherein the flow of water delivered to said fish is substantially at the acclimated temperature of the fish.

3. A method is claimed in claim 1 wherein the water flow supplied to said fish is debubbled.

4. A method as claimed in claim 1 wherein said fish is restrained in its normal swimming orientation.

5. An apparatus for transporting a live fish comprising a water holding container having at least one fish holding cavity therein, said fish holding cavity being sized and configured to limit but not prevent movement of the fish within the container and to maintain the gills of the fish held therein constantly immersed in water, the cavity being defined by spaced lateral walls and a bottom shaped to support ventral surfaces of the fish, the apparatus having water supply means including a water inlet to said fish holding cavity, a water outlet from the fish holding cavity, treatment means between the water outlet and the water inlet, the treatment means being operable to clean and oxygenate water drawn from said fish holding cavity, and pump means operable to return cleaned and oxygenated water from the treatment means to the water inlet.

6. Apparatus as claimed in claim 5, wherein the container includes a plurality of said fish holding cavities, said water supply means being constructed and arranged to, in use, supply water to each of the cavities.

7. Apparatus as claimed in claim 5 wherein said cavity is arranged to restrain said fish substantially in the normal swimming orientation.

8. Apparatus as claimed in claim 7 wherein said cavity is arranged to restrain said fish against substantial lateral movement.

9. Apparatus as claimed in claim 5 wherein said cavity is constructed and arranged to retain a pool of water in contact with at least part of the fish restrained thereby.

10. Apparatus as claimed in claim 5, wherein said treatment means includes filtering means to remove particulate matter from said water; and ammonia removal means to remove ammonia from said water.

11. Apparatus as claimed in claim 10 wherein said treatment means further includes debubbling means to remove bubbles from the water returning to the fish.

12. Apparatus as claimed in claim 11 wherein said debubbling means is included, at least in part, in said filtering means.

13. Apparatus as claimed in claim 11 wherein said ammonia removal means includes means to chlorinate the ammonia contaminated water and means to remove excess chlorine from the water.

14. An apparatus as claimed in claim 5, wherein the container includes at least one row of said cavities disposed side by side and the water supply means comprises a self-contained unit within the container at one end of the cavities.

* * * * *